United States Patent

Kozuka et al.

Patent Number: 5,344,196
Date of Patent: Sep. 6, 1994

[54] METALLIC HOSE JOINT

[75] Inventors: Hajime Kozuka, Tokyo; Youichi Furuya, Kanagawa; Takahiro Yoda, Kanagawa; Kazuo Kitamura, Kanagawa; Terutsugu Ijima, Kanagawa, all of Japan

[73] Assignees: Mitsubishi Jidosha Kogyo Kabushiki Kaisha; Kabushiki Kaisha Meiji Gomu Kasei, both of Tokyo, Japan

[21] Appl. No.: 91,737

[22] PCT Filed: Jan. 9, 1991

[86] PCT No.: PCT/JP91/00005
§ 371 Date: Nov. 4, 1991
§ 102(e) Date: Nov. 4, 1991

[87] PCT Pub. No.: WO91/10860
PCT Pub. Date: Jul. 25, 1991

Related U.S. Application Data

[63] Continuation-in-part of Ser. No. 752,691, Nov. 4, 1991, abandoned.

[30] Foreign Application Priority Data

Jan. 11, 1990 [JP] Japan ................... 2-1503
Jan. 11, 1990 [JP] Japan ................... 2-1504
Jun. 6, 1990 [JP] Japan ................... 2-60025

[51] Int. Cl.$^5$ .............................................. F16L 33/02
[52] U.S. Cl. .................................... 285/149; 285/256
[58] Field of Search ................ 285/149, 256, 259, 353

[56] References Cited

U.S. PATENT DOCUMENTS

| | | | |
|---|---|---|---|
| 2,453,997 | 11/1948 | MacWilliam | 285/256 |
| 3,245,699 | 4/1966 | Peterman | 285/259 X |
| 3,252,720 | 5/1966 | Waite | 285/256 |
| 4,786,757 | 11/1988 | Owensby et al. | 285/149 X |

FOREIGN PATENT DOCUMENTS

| | | | |
|---|---|---|---|
| 2423347 | 5/1974 | Fed. Rep. of Germany | 285/256 |
| 61-175393 | 7/1986 | Japan | |
| 63-37591 | 4/1988 | Japan | |
| 0579395 | 8/1946 | United Kingdom | 285/256 |
| 0955498 | 4/1964 | United Kingdom | 285/149 |
| 1083741 | 9/1967 | United Kingdom | 285/256 |

Primary Examiner—Randolph A. Reese
Assistant Examiner—Heather Chun
Attorney, Agent, or Firm—Nikaido Marmelstein Murray & Oram

[57] ABSTRACT

The present invention incorporates a nipple to be inserted inside a hose and a sleeve formed concentrically with the nipple. An annular groove is formed on the outer periphery of the nipple to receive the expanded portion of the rubber toward the tip end of the nipple when the sleeve is caulked and to prevent the rubber from bulging at the tip end of the nipple. The annular groove is configured so that it can receive a portion of the inner rubber wall of hose when the hose is inserted between the nipple and the sleeve when the latter is caulked. The annular groove may be located on the outer periphery of the nipple, such as at a position offset from being in-line with where the sleeve is caulked and nearer to the tip end of the nipple. The number of annular grooves is not limited to one, and may be plural. When plural grooves are formed, they may be arranged adjacent to each other or spaced at a given interval.

13 Claims, 4 Drawing Sheets

_5,344,196_

METALLIC HOSE JOINT

This application is a continuation of patent application Ser. No. 07/752,691, filed Nov. 4, 1991, now abandoned.

FIELD OF THE INVENTION

The present invention relates to a metallic hose joint, and more particularly to a metallic joint comprising a nipple and a sleeve for caulking a hose made of a heat resistant material that can withstand high temperature fluids.

The present invention is applicable to hoses made of rubber or resin such as power steering hose, oil brake hose, hydraulic suspension hose, oil hose, fuel hose, high pressure hydraulic hose, and super-high pressure hose for water jet.

BACKGROUND OF THE INVENTION

It is known in the art to use metallic hose joints that can be fixed on hoses made of rubber or resin for connecting the hoses to different equipments. Hose joints of this type and particularly those for high pressure fluids should not leak during use at the portion where the joint and the hose are tightly connected. The hose joint must therefore have high and continuous sealing performance to prevent fluid leakage.

FIGS. 10 and 11 show examples of the prior art metallic hose joint.

The metallic hose joint 1 shown in FIG. 10 comprises a nipple 3 to be inserted into a rubber hose 2 and a sleeve 5 which is formed concentrically with said nipple 3, and is tightly engaged with the rubber hose 2 by means of annular caulking members 7, 7a that are formed by pressing the sleeve 5 in the radial direction.

The shown rubber hose 2 is provided with a reinforcement layer 13 between its inside rubber wall 9 and outside rubber wall 11 made of heat resistant rubber. The inside rubber wall 9 is made of soft rubber such as nitrile and neoprene rubber. The reinforcement layer 13 comprises braid, thread wound in spiral, or wire and the like. The outer periphery of the nipple 3 has circumferential serrations 15 to prevent slipping off of the hose.

The rubber hose 2 is inserted in the gap between the nipple 3 and the sleeve 5 of the above construction, and the caulking members 7 and 7a provided at two locations on the sleeve 5 are utilized to fixedly engage the rubber hose 2 with the joint 1 by a so-called two-stage caulking structure.

FIG. 11 shows another example of the a prior art hose joint which differs from the first example in the inner shape of the sleeve and in the caulking method.

The metallic hose joint la comprises a nipple 3a and a sleeve 5a. The nipple 3a is identical in shape with the nipple 3, but the sleeve 5a is provided on its inside face with an annular groove 17 extending in the circumferential direction. The sleeve is indented radially to form a so-called flat caulking member 7b.

To prevent fluid leakage via the faces where the nipple 3 or 3a and the sleeve 5 or 5a come in contact with the inner and outer walls of the prior art hose 2, tightening force exerted by the nipple 3, 3a and the sleeve 5, 5a may be increased. However, when the tightening force is increased too much, the inner wall 9 of the rubber hose may be broken by the serrations 15. Even if pressed, a portion of the rubber volume would shift to where the pressure is not acting, as the rubber is elastic and forms an annular bulge 19 or 19a along the entire circumference at the tip of the nipple 3, 3a (the end face in the direction of hose insertion). As the bulge 19 or 19a is subjected to substantial deformation, this portion would easily become deteriorated by repeated compressions, causing cracks over a short period of time.

Further, when the bulge 19 or 19a is formed, the tightening force would decrease for the volume of the rubber being shifted, failing to achieve the desired tightening.

As the temperature of the rubber hose rises when the equipment to which it is attached is in use, stress on the rubber between the nipple 3, 3a and the sleeve 5, 5a would increase due to thermal expansion. In other words, the stress of the rubber increases as the rubber temperature rises, and the sealing performance would temporarily improve. However, the rubber temperature drops with time after the operation of the equipment is suspended, causing gradual stress relaxation. As the time elapses, the stress relaxation accelerates. The rubber stress is thus decreased by being repeatedly subjected to temperature rise and drop, and the rubber hose would eventually lose its sealing property against the fluid.

The present invention has been created in view of the foregoing situation.

The first object of the present invention is to provide a metallic hose joint for hoses by improving the nipple to prevent its bulging and to thereby prevent stress relaxation.

The second object of the present invention is to provide a metallic hose joint for hoses which maintains high sealing performance over an extended use.

DISCLOSURE OF THE INVENTION

The present invention comprises a nipple to be inserted inside a hose and a sleeve formed concentrically with said nipple. An annular groove is formed on the outer periphery of the nipple to receive the expanded portion of the rubber toward the tip end of the nipple when the sleeve is caulked and to prevent the rubber from bulging at the tip end of the nipple.

The annular groove is so configured that it can receive a portion of the inner rubber wall of hose when the hose is inserted between the nipple and the sleeve and the latter is caulked. The annular groove has a size sufficient to receive the bulging inner rubber wall with an allowance, forming a gap at the bottom. It should be noted that the configuration of the annular groove is suitably determined depending on the diameter, thickness and material of the rubber hose and on the tightening force of the sleeve.

The annular groove may be arbitrarily located on the outer periphery of the nipple, such as at a position nearer to the tip end of the nipple than where the sleeve is caulked, or at a position nearer to the tip end of the nipple than the end of the caulking portion on the side of the hose insertion. Conversely, the annular groove may be formed on the nipple at a position nearer to the dead-end of the sleeve than the end of the caulking portion on the side of the hose insertion.

The number of annular groove is not limited to one, and may be plural. When plural grooves are formed, they may be arranged adjacent to each other or may be distanced at a given interval.

The configuration of the groove is not specifically limited. A groove may be a rectangle in section with a flat horizontal bottom. It may be a letter U shape with a curved bottom. The upper edge of the groove is preferably curved so as not to damage the inner wall of the rubber hose.

The operations of the present invention will now be described. Firstly, bulging of the rubber is prevented. When the sleeve is caulked, the inner rubber wall of the hose inserted between the nipple and the sleeve tends to shift toward the tip end of the nipple for the amount being compressed. However, the annular groove formed on the outer periphery of the nipple receives the rubber that has shifted. Thus, the present invention prevents shifting of the rubber on the inner wall of the hose toward the tip end of the nipple and prevents it from bulging.

Secondly, the present invention prevents stress relaxation. The annular groove is so configured that there will be formed an allowance gap at its bottom when it receives a portion of the inner rubber wall of the hose, instead of being fully filled with the rubber. Thus, the present invention acts to absorb thermal expansion of the inner rubber wall of the hose to thereby prevent stress relaxation.

The present invention improves the sealing at the contact face between the nipple and the inner rubber wall. As a portion of the rubber hose enters the annular groove, the upper edge of the groove will press against the rubber to improve the sealing.

The objects and merits of the present invention as mentioned above will be fully understood from the following description taken in conjunction with the attached drawings.

PREFERRED EMBODIMENTS OF THE INVENTION

The present invention will now be described in more detail by way of embodiments.

In the Embodiments shown in FIGS. 1 through 4, the annular groove is formed at a position nearer to the tip end of the nipple than the end of the caulking portion of the sleeve on the side of the hose insertion.

Figure 1:
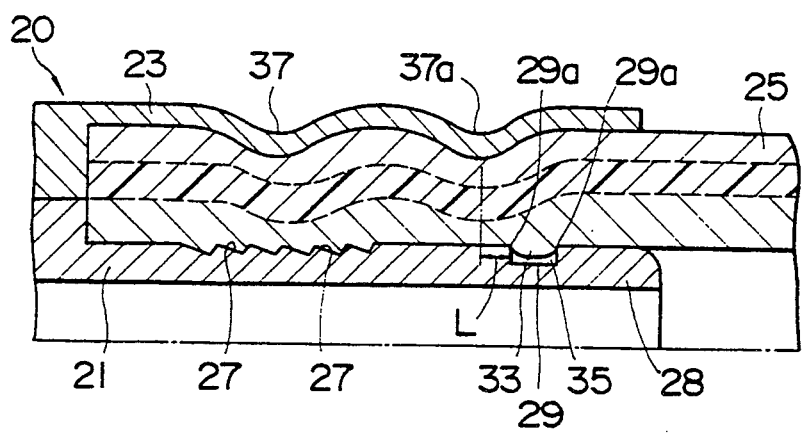
FIG. 1 is a partial sectional side view to show the first embodiment of the metallic hose joint according to the present invention.
Figure 2:
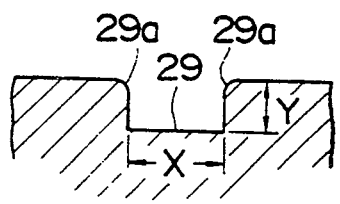
FIG. 2 is an enlarged sectional view to explain the structure of the annular groove formed on the outer periphery of the nipple.
Figure 10:
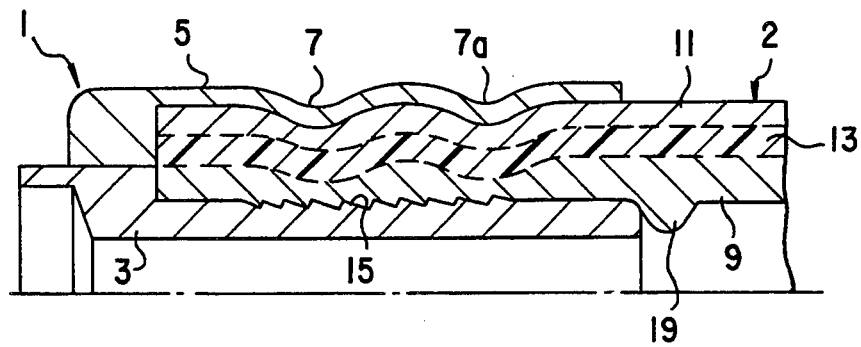
FIG. 10 discloses a prior art joint.

The metallic hose joint 20 shown in FIG. 1 is substantially the same in structure as the prior art hose joint shown in FIG. 10. It comprises a nipple 21 and a sleeve 23, to which a rubber hose 25 is fixed. Serrations 27 are formed on the outer periphery of the nipple 21 to improve the sealing performance and to avoid slipping off of the hose. An annular groove 29 is formed near the tip end 28 of the nipple from where the hose is inserted.

The width and the depth of the annular groove 29 are such that the groove will not be filled with the portion of the rubber wall that enters there when the sleeve is caulked. Thus, there will be a gap 35 between the bulge 33 entering the groove 29 and the bottom thereof. Preferably, the gap 35 is such that even if the bulge 33 becomes thermally expanded during use, the bulge 33 will not come in contact with the bottom of the groove 29. The upper edge 29a of the groove 29 is preferably rounded to prevent it from damaging the inner wall of the rubber hose.

Although the annular groove 29 is shown to have a flat bottom in the above-mentioned embodiment, the shape of the groove is in no way limited to the above. The groove 29 may be shaped like a letter U with a curved bottom. The annular groove preferably measures 1 mm–5 mm in width X, 1 mm–3 mm in depth Y, and 0.1 R–1 R in curvature at the upper edge 29a (see FIG. 2).

The annular groove 29 is formed at a position nearer to the tip end 28 of the nipple 21 than a position corresponding to the caulking member 37a of the sleeve 23. Given the distance from where the caulking member 37a is located to the groove 29 as L, it is preferable that L=0 mm−10 mm. By forming the groove 29 at a position nearer to the tip end 28 of the nipple 21 than where the caulking member 37a is located, or in the direction the inner rubber wall 31 is shifted, the deformation of rubber can be absorbed by the groove, preventing formation of bulging.

Figure 3:
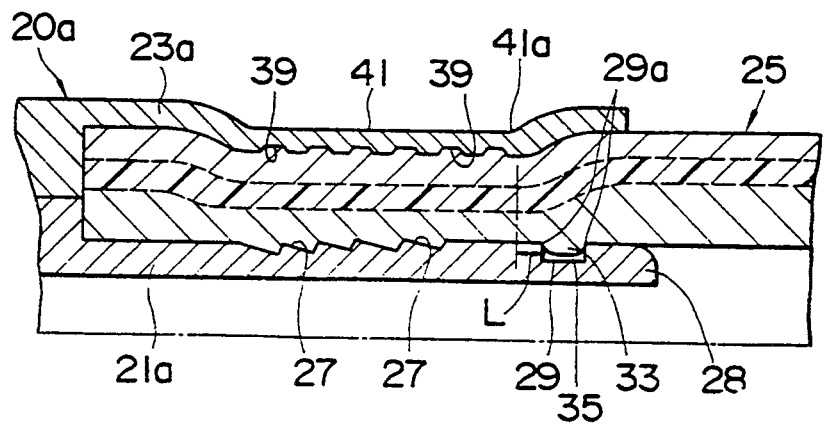
FIG. 3 is a partial sectional side view to show the second embodiment of the metallic hose joint according to the present invention.
Figure 11:
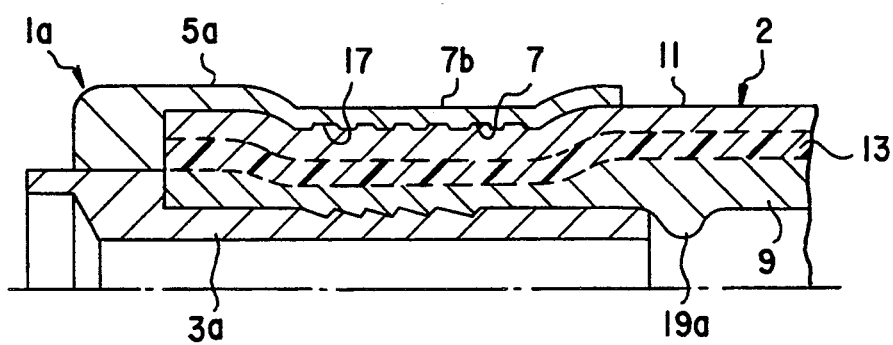
FIG. 11 also discloses a prior art joint.

FIG. 3 corresponds to the prior art caulking structure shown in FIG. 11. The metallic joint 20a comprises a nipple 21a provided with serrations 27 on its outer periphery and a sleeve 23a provided circumferentially with an annular groove 39 on its inner surface. The joint 21a is tightly fixed to a hose 25 by means of a caulking member 41 having a so-called flat caulking structure with a narrower portion. The annular groove 29 of this embodiment is also formed at a position nearer to the tip end 28 of the nipple than the end 41a of the caulking member 41 on the side of the sleeve tip. The shape, size and position of the annular groove 29 are identical with those of the first embodiment. Description of its detail is therefore omitted here.

Figure 4:
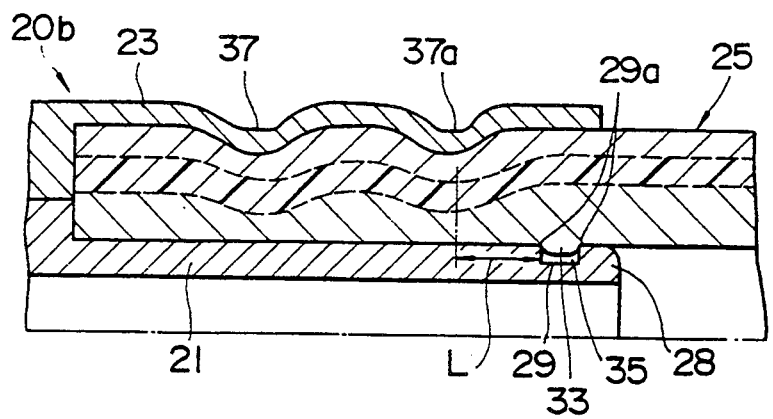
FIG. 4 is a partial sectional side view of the third embodiment of the metallic hose joint according to the present invention.

The third embodiment shown in FIG. 4 differs from the first embodiment in that the serrations 27 of the nipple 21 are omitted. The same reference numbers are used for the metallic joint 20b shown in the figure, and the description is omitted.

Figure 5:
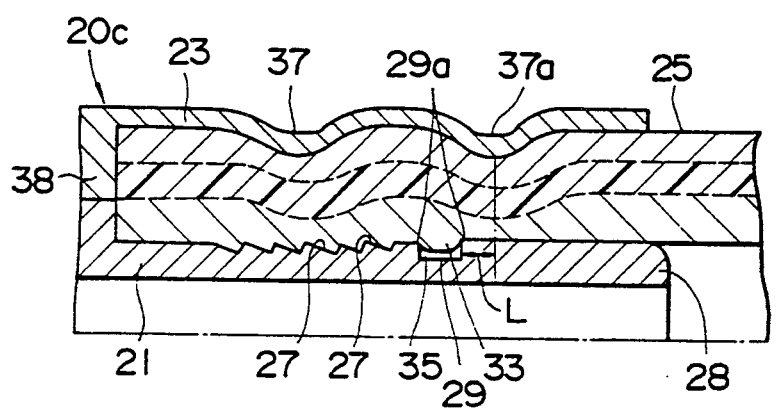
FIG. 5 is a partial sectional side view to show the fourth embodiment of the metallic hose joint according to the present invention.

Similarly, the same component parts are denoted by the same reference numbers in the embodiments shown in FIG. 5 and thereafter, and description is omitted.

Figure 6:
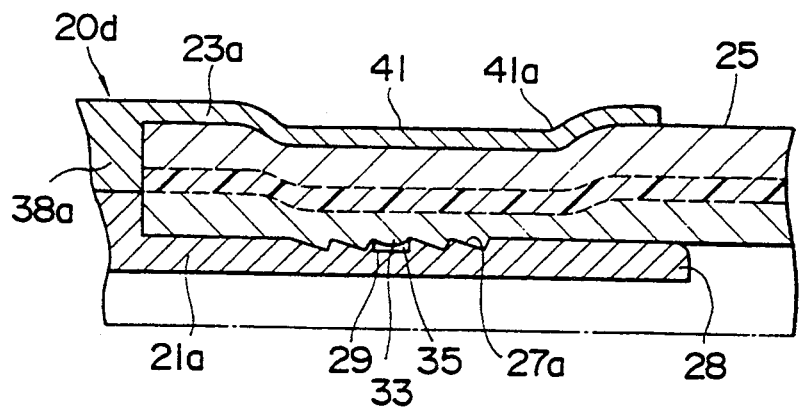
FIG. 6 is a partial sectional side view to show the fifth embodiment of the metallic hose joint according to the present invention.

FIGS. 5 and 6 show embodiments wherein the annular groove is formed at a position nearer to the dead-end of the sleeve than the end of the caulking member on the side of the hose insertion. In the case so-called two-stage caulking structure is employed, the annular groove will be formed at a position nearer to the dead-end of the sleeve than the end of the caulking member on the side of the open end of the sleeve.

The metallic hose joint 20c according to the fourth embodiment as shown in FIG. 5 has the same structure as the joint 20 shown in FIG. 1 except for the position of the annular groove 29. The annular groove 29 is nearer to the dead-end of the sleeve 23 than the caulking member 37a located on the side of the open end of the sleeve.

In case of the two-stage caulking structure such as shown in FIGS. 1, 4 and 5, stress concentrates on the portion directly below the caulking member, and the inner rubber wall is likely to be damaged by the upper edge 29a of the groove 29. The position of the groove is therefore preferably be any place other than directly below the caulking member.

The metallic joint 20d of the fifth embodiment shown in FIG. 6 has the same caulking structure as the joint 20a of FIG. 3, or so-called flat structure. In other words, the flatly indented portion of the caulking member 41 enables the joint and the hose to be tightly fixed together. The annular groove 29 is located nearer to the dead-end of the sleeve than the end 41a of the caulking member 41 on the side of the sleeve tip and substantially at the center of the portion with serrations 27a. Otherwise, this embodiment is identical in structure with the second embodiment, and description is omitted.

Description will now be given to the sixth and seventh embodiments wherein the annular groove on the outer periphery of the nipple is divided into two with an annular partition wall erected at the center.

Figure 7:
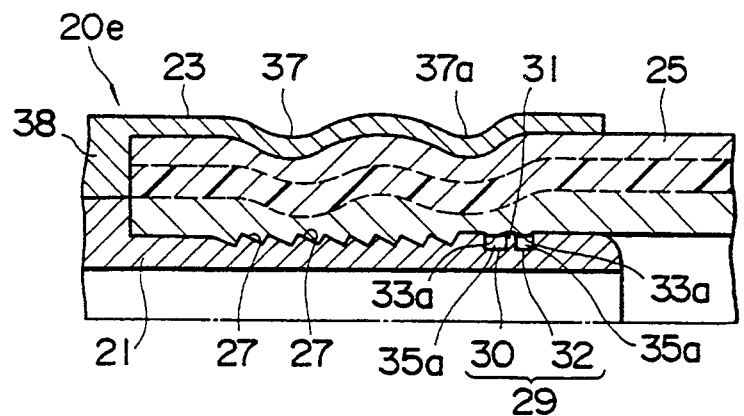
FIG. 7 is a partial sectional side view to show the seventh embodiment of the metallic hose joint according to the present invention.

The metallic joint 20e shown in FIG. 7 employs the two-stage caulking method mentioned with respect to embodiments shown in FIGS. 1, 4 and 5, and has serrations 27 on the outer periphery of the nipple 21.

The annular groove 29 is divided into two grooves 30 and 32 by an annular partition 31 provided substantially at the center of the groove 29. The width and the depth of the grooves 30 and 32 are such that although the bulging rubber wall enters there when caulked with the sleeve, the bulge will not entirely fill the grooves. Thus, there will be formed a gap 35a each between the bottom of the grooves 30 and 32 and the bulge 33a entering there. The gap 35a is preferably such that even if the bulges 33 may become thermally expanded during use, they will not come in contact with the bottom of the grooves 30 and 32 respectively.

Figure 8:
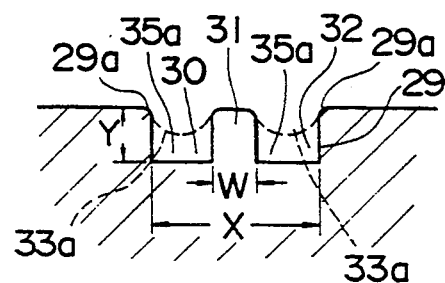
FIG. 8 is an enlarged sectional view to explain the structure of the annular groove of the sixth embodiment.

Referring now to FIG. 8, the configuration of the annular groove 29 will be described. The annular groove 29 measures 1.5 mm–10 mm in width X and 1 mm–3 mm in depth Y, and the partition 31 measures 0.5 mm–3 mm in width. The upper edges of the annular groove 29 and the partition 31 are preferably rounded at a curvature of 0.1 R–1 R to prevent the inner rubber wall from being damaged.

Figure 9:
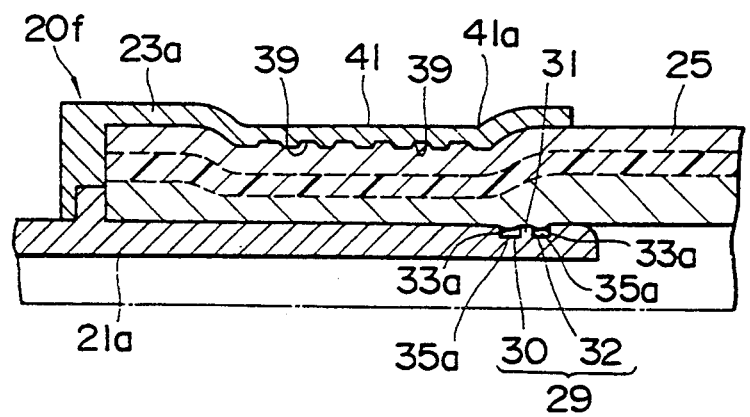
FIG. 9 is a partial sectional side view to show the seventh embodiment of the joint according to the present invention.

The metallic joint 20f shown in FIG. 9 is the seventh embodiment and has the flat caulking structure such as shown in FIGS. 3 and 6. The structure of the annular groove 29 in this embodiment is identical with that of the sixth embodiment shown in FIG. 7. That is, the annular groove 29 is sectioned into grooves 30 and 32 by an annular partition 31. The grooves 30 and 32 are formed in such a manner that there will be a gap 35a between the bottom thereof and the bulge 33a formed by the inner rubber wall will enter there when the sleeve is caulked. Even if the bulge becomes thermally expanded during use, the bulge will not come in contact with the bottom.

In the sixth and seventh embodiments, the annular groove 29 is located nearer to the tip end of the nipple than the end 37a, 41a of the caulking member 37, 41 on the side of the sleeve tip. However, the position of the groove is not thereby limited, and it may be located nearer to the dead-end of the sleeve than said end 37a, 41a of the caulking member 37, 41. When the annular groove is located nearer to the tip end of the nipple than the caulking member, the sealing performance will improve and bulging of the inner rubber wall is prevented more effectively.

Impulse tests and long-term pressure test were conducted to compare the present invention with the prior art.

The rest of impulse test will be discussed first. The test was conducted according to JASO M326 (repeated pressure test for power steering hose and assembly for automobiles). The hose used in the test is a power steering hose which comprises the inner wall made of NBR, a reinforcement layer made of nylon braid, and the outer rubber wall of CR, and measures 9.7 mm in inner diameter and 19.5 mm in outer diameter. The prior art metallic joint shown in FIG. 11 was attached to the hose and caulked for comparison. The hose joints according to the second and seventh embodiments as shown in FIGS. 3 and 9 were attached to the hose and caulked for the test.

Power steering fluid (PSF) was used as the fluid oil in the test, which was conducted at the oil temperature of 120° C. and ambient temperature of 120° C., the pressure waveform of a trapezoidal wave of 70 CPM, and at the maximum pressure of 120 kg/cm$^2$.

The test results are given below.

|  | No. of cycles | Cause of break |
| --- | --- | --- |
| Comparative Embodiment | 1.5–1.8 mill. | Crack on the bulge of the inner rubber wall |
| Second Embodiment | 2.2–2.5 mill. | Crack of the inner rubber wall at the mid portion of the hose |
| Seventh Embodiment | 2.5–2.8 mill. | Crack of the inner rubber wall at the mid portion of the hose |

The results of long-term pressure test will be discussed below. The test was conducted according to JASO M 326. The hose used in the test is a power steering hose which comprises the inner wall made of CSM, a reinforcement layer made of nylon braid, and the outer rubber wall of CSM, and measures 8 mm in inner diameter and 18 mm in outer diameter. The prior art metallic joint shown in FIG. 11 was attached to the hose as Comparative Embodiment 1, and the prior art joint shown in FIG. 10 as Comparative Embodiment 2. The hose joints according to Embodiments 1 through 4 and Embodiments 6 and 7 shown in FIGS. 1, 3, 4, 5, 7 and 9 respectively were attached to the hose and caulked for the test.

Automatic transmission fluid (ATF) was used as the fluid oil in the test. The hose was maintained at 150° C. for 70 hours to deteriorate to a certain extent, and applied with a static pressure of 150 kgf/cm$^2$. Leakage of ATF was observed.

The test results are shown below.

| | |
| --- | --- |
| Comparative Embodiment 1 | Leakage occurred after 1 hour |
| Comparative Embodiment 2 | Leakage occurred after 1 hour |
| Embodiment 1 | No leakage after 48 hours |
| Embodiment 2 | No leakage after 48 hours |

-continued

| | |
|---|---|
| Embodiment 3 | Leakage occurred after 5 hours |
| Embodiment 4 | No leakage after 48 hours |
| Embodiment 6 | Leakage occurred after 10 hours |
| Embodiment 7 | No leakage after 50 hours |

As is evident from these test results, the metallic hose joint according to the present invention is more capable of withstanding a long-term use than the prior art joints.

FIELD OF INDUSTRIAL APPLICATION

As has been described in the foregoing, the metallic hose joint according to the present invention is applicable to hoses made of rubber or resin such as power steering hose, oil brake hose, hydraulic suspension hose, oil hose, fuel hose, hydraulic high pressure hose, and super-high pressure water jet hose where high and continuous sealing performance is required for an extended period of time.

What we claim:

1. A metallic hose joint which comprises:
   a nipple, with an inner periphery and a tip end, to be inserted in a rubber hose, with an inner wall,
   a sleeve, with a base end and a tip end, formed concentrically with said nipple, wherein said tip end of said nipple and said tip end of the sleeve are disposed approximately adjacent to each other;
   a ring-shaped caulking portion defined on said sleeve;
   wherein said sleeve is used to tightly fix the hose by inserting the hose into a gap between the nipple and the sleeve wherein said gap at the tip end has a size approximately equivalent to the hose and by applying said caulking portion of the sleeve wherein when said caulking portion is applied a bulge in said hose is created;
   and external bulge prevention means for preventing formation of an external bulge when the hose is fixedly held by the sleeve, wherein said external bulge preventing means comprises an annular groove, with a bottom and an upper edge, defined on an outer periphery of said nipple to receive the inner rubber wall of the hose when the sleeve is caulked, wherein said groove has a size to allow a gap between said bottom thereof and the rubber wall bulging therein, and wherein said annular groove is formed at a position offset from being in-line with said caulking portion and nearer to said tip end of the nipple.

2. The metallic hose joint as claimed in claim 1 wherein said annular groove measures 1 mm–5 mm in width and 1 mm –3 mm in depth.

3. The metallic hose joint as claimed in claim 1 wherein said annular groove is sectioned into two parts by an annular partition.

4. The metallic hose joint as claimed in claim 3 wherein said annular groove measures 1.5 mm–10 mm in entire width and 1 mm–3 mm in depth, and 0.5 mm–3 mm in width of the partition.

5. A metallic hose joint as claimed in any one of claims 1 through 4 wherein said annular groove is formed at a position near to the base-end of the sleeve than the end of the caulking member of the sleeve nearest the tip end of the sleeve.

6. The metallic hose joint as claimed in claim 5 wherein an upper edge of the annular groove is rounded.

7. The metallic hose joint as claimed in claim 5 wherein said annular groove is formed as a rectangle in section with a flat bottom.

8. The metallic hose joint as claimed in claim 5 wherein said annular groove is formed in a letter U shape with a curved bottom.

9. The metallic hose joint as claimed in claim 5 wherein at least two annular grooves are formed.

10. The metallic hose joint as claimed in claim 9 wherein a one of said at least two annular grooves measures 1 mm–5 mm in width and 1 mm–3 mm in depth and a second of said at least two annular grooves is sectioned into two parts by an annular partition and measures 1.5 mm–10 mm in entire width and 1 mm–3 mm in depth, and 0.5 mm–3 mm in width of the partition.

11. A metallic hose joint, comprising:
   a hose formed from at least one of rubber and a thermosetting material;
   a nipple, with a tip end, to be inserted in said hose;
   a sleeve, with a tip end, formed concentrically with said nipple and which is used to tightly fix said hose by inserting said hose in a gap between said nipple and said sleeve wherein said gap at the tip end has a size approximately equivalent to the hose, wherein said tip end of said nipple and said tip end of the sleeve are disposed approximately adjacent to each other; and
   means for preventing a formation of bulges when said hose is fixedly held by said sleeve, said bulge preventing means including at least one ring-shaped caulking member formed on said sleeve, for fixedly holding said hose to said sleeve and an annular groove defined on an outer periphery of said nipple and positioned offset from being in-line with the caulking member,
   said hose having an inner wall formed so as to be received in the annular groove on said nipple when said sleeve is caulked with said hose, the groove being defined to allow a gap between a bottom portion thereof and the wall bulging therein.

12. A metallic hose joint as claimed in claim 11, wherein said bulge preventing means includes at least two annular grooves defined on the outer periphery of said nipple and separated by an annular partition.

13. A metallic hose joint comprising:
   a nipple with a tip end and a base end;
   a sleeve with a tip end and a base end formed concentrically with said nipple for retaining a thermoset hose that is inserted between a gap said nipple and said sleeve wherein said gap at the tip end has a size approximately equivalent to the hose, wherein said tip end of said nipple and said tip end of the sleeve are disposed approximately adjacent to each other;
   a caulking means integrally formed in said sleeve for fixing said hose after said hose has been inserted into said nipple and sleeve so as to prevent further movement of said hose in or out of said nipple and sleeve, and for creating a bulge in said hose;
   an external bulge preventing means for retaining said bulge within said nipple and sleeve wherein said external bulge preventing means comprises an annular groove disposed in said nipple wherein said groove and said bulge define a gap; and
   wherein said external bulge preventing means is disposed in said nipple so as not to be directly opposite said caulking means.

* * * * *